US012507055B2

(12) United States Patent
Calme et al.

(10) Patent No.: US 12,507,055 B2
(45) Date of Patent: Dec. 23, 2025

(54) TRACKING RECEPTION OF WIRELESS EMERGENCY ALERTS

(71) Applicant: United States Cellular Corporation, Chicago, IL (US)

(72) Inventors: James A. Calme, Aurora, IL (US); Randall Scott Fassbinder, Chicago, IL (US); Narothum Saxena, Hoffman Estates, IL (US); Michael S. Irizarry, Barrington Hills, IL (US)

(73) Assignee: T-Mobile Innovations L.L.C., Bellevue, WA (US)

( * ) Notice: Subject to any disclaimer, the term of this patent is extended or adjusted under 35 U.S.C. 154(b) by 398 days.

(21) Appl. No.: 18/201,354

(22) Filed: May 24, 2023

(65) Prior Publication Data

US 2024/0397298 A1 Nov. 28, 2024

(51) Int. Cl.
*H04W 4/90* (2018.01)
*H04W 24/10* (2009.01)

(52) U.S. Cl.
CPC ............. *H04W 4/90* (2018.02); *H04W 24/10* (2013.01)

(58) Field of Classification Search
CPC ................................ H04W 24/10; H04W 4/90
USPC ...................................................... 455/404.1
See application file for complete search history.

(56) References Cited

U.S. PATENT DOCUMENTS

| | | | | |
|---|---|---|---|---|
| 9,742,709 | B1 * | 8/2017 | Laich | H04L 51/046 |
| 11,995,978 | B1 * | 5/2024 | Lan | G10L 13/00 |
| 2003/0069002 | A1 * | 4/2003 | Hunter | G08B 21/12 |
| | | | | 455/567 |
| 2012/0028600 | A1 * | 2/2012 | Vallaire | G08B 27/00 |
| | | | | 455/404.2 |
| 2019/0380020 | A1 * | 12/2019 | Pellegrini | G08B 25/006 |
| 2020/0098230 | A1 * | 3/2020 | Dwight | G09B 9/00 |
| 2021/0352438 | A1 * | 11/2021 | Ford | H04W 4/029 |
| 2022/0014895 | A1 * | 1/2022 | Horelik | G08B 21/0261 |

* cited by examiner

Primary Examiner — Maria El-Zoobi
(74) Attorney, Agent, or Firm — Shook, Hardy & Bacon L.L.P.

(57) ABSTRACT

A method and system are described for providing an accumulated set of alert response message content arising from disseminating an emergency alert message to user equipment via mobile wireless network infrastructure. An emergency alert is received that is issued by an emergency alert system. The emergency alert includes: an emergency description, and a target geographic area. An emergency alert message, corresponding to the emergency alert, is disseminated to user equipment via mobile wireless infrastructure. A set of alert response messages issued by user equipment responding to the emergency alert message are accumulated. Instances of the alert response messages provide: an emergency alert identification, a user equipment location, and an alert message handling result. An aggregated result is presented that indicates user equipment-issued alert response messages.

20 Claims, 4 Drawing Sheets

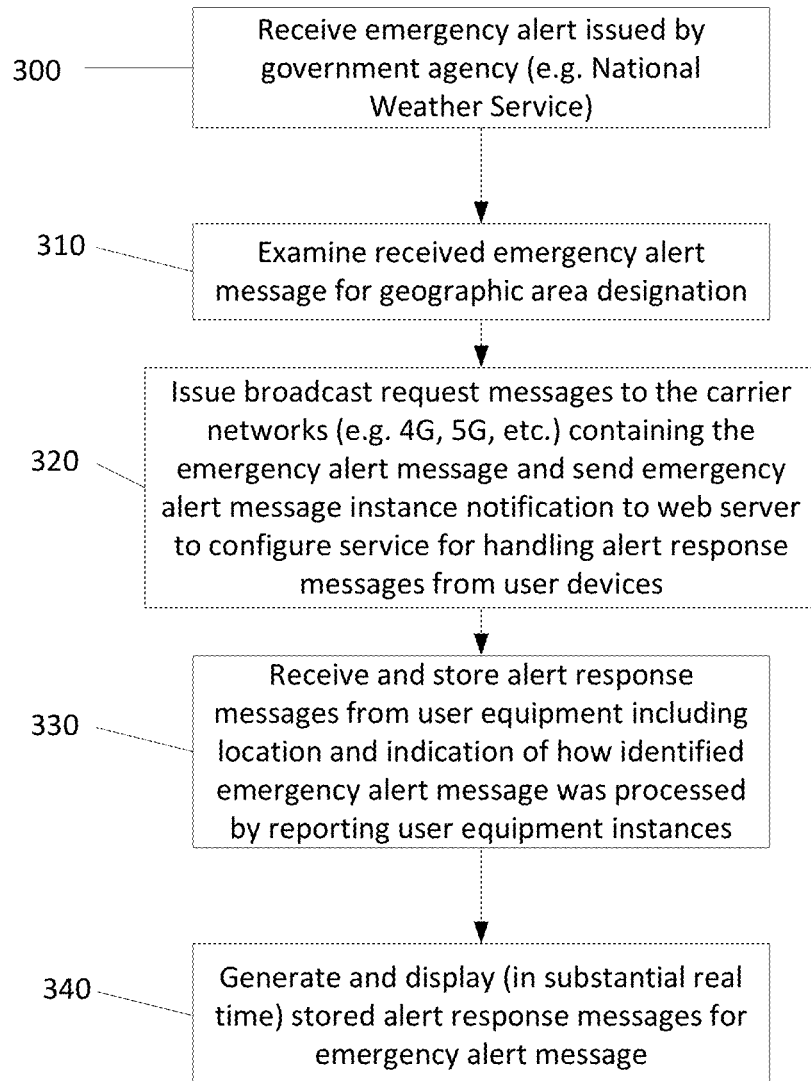

| Message type 210 |
| Message Identifier 220 |
| Serial Number 230 |
| Message Accepted flag 240 |
| Location 250 |
| Message Received Timestamp 260 |

FIG. 2

300 — Receive emergency alert issued by government agency (e.g. National Weather Service)

310 — Examine received emergency alert message for geographic area designation

320 — Issue broadcast request messages to the carrier networks (e.g. 4G, 5G, etc.) containing the emergency alert message and send emergency alert message instance notification to web server to configure service for handling alert response messages from user devices 330 — Receive and store alert response messages from user equipment including location and indication of how identified emergency alert message was processed by reporting user equipment instances 340 — Generate and display (in substantial real time) stored alert response messages for emergency alert message

FIG. 3

TRACKING RECEPTION OF WIRELESS EMERGENCY ALERTS

FIELD OF THE INVENTION

This invention relates generally to the field of mobile wireless communications networks. More particularly, the invention is directed to supporting broadcast mobile wireless data communication services in such networks, and more specifically to tracking effectiveness (e.g., reliability, delay, accuracy of reach, etc.) of emergency notification broadcasts disseminated via mobile wireless networks.

BACKGROUND OF THE INVENTION

Mobile wireless systems today provide, in addition to voice and digital data services, broadcast services for providing wireless emergency alerts that are propagated by broadcasting such alert messages to mobile wireless device users in designated areas.

A particular example of a public warning service is the Commercial Mobile Alert System (CMAS)—also known as the Personal Localized Alerting Network (PLAN). CMAS is an outgrowth of a broad initiative, the Integrated Public Alert and Warning System (IPAWS). The IPAWS infrastructure includes a mobile wireless alerting capability. Including mobile wireless alerts under the IPAWS system reflects the important role of mobile wireless technologies in disseminating alerts and warnings involving the public well-being. Providing critical alert information in a timely manner, via mobile wireless devices, enables the public to avoid danger or respond more quickly during crisis-potentially saving lives and preventing/reducing property damage costs.

CMAS is a special-purpose message dissemination infrastructure established for the purpose of effectively disseminating emergency alerts, via wireless service providers, to mobile wireless devices such as cell phones in designated geographic areas. CMAS enables federal agencies to accept and aggregate alerts from any of a wide variety of organizations including: the President of the United States, the National Weather Service (NWS) and emergency operations centers. CMAS then sends the alerts to mobile wireless service providers. The mobile wireless service providers then broadcast, by way of example, the CMAS alerts, for example, in the form of text, to mobile wireless devices of subscribers. Examples of alerts include: alerts issued by the President, alerts relating to threats of physical harm (e.g., severe weather) and AMBER Alerts.

Thus, the current wireless emergency alert infrastructure established under CMAS supports well-defined automated systems for quickly and efficiently broadcasting emergency alerts to users of mobile wireless devices in designated geographic areas. However, there is currently no automated arrangement in place for measuring the reliability/effectiveness/degree of success of such wireless emergency alert system broadcasts with respect to, for example, reception and thereafter execution/presentation/display of emergency warning messages by mobile devices.

A significant technological challenge to accurately/timely measuring effectiveness of emergency messages broadcast via mobile wireless networks is the inability of mobile wireless network infrastructure to receive, accumulate and process confirmatory messages from mobile wireless devices that have received broadcast emergency messages.

BRIEF SUMMARY OF THE INVENTION

A method is described for providing an accumulated set of alert response message content arising from disseminating an emergency alert message to user equipment via mobile wireless network infrastructure. An emergency alert is received that is issued by an emergency alert system. The emergency alert includes: an emergency description, and a target geographic area. An emergency alert message, corresponding to the emergency alert, is disseminated to user equipment via mobile wireless infrastructure. A set of alert response messages issued by user equipment responding to the emergency alert message are accumulated. Instances of the alert response messages provide: an emergency alert identification, a user equipment location, and an alert message handling result. An aggregated result is presented that indicates user equipment-issued alert response messages.

The invention further includes a system, including a processor and a non-transitory computer readable medium including computer-executable instructions that, when executed by components of the disclosed system facilitate performing the above-summarized method.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 2 summarizes fields of a data payload for an alert response message provided by user equipment in accordance with processing a received CMAS alert in accordance with the present disclosure;

FIG. 3 is a flow chart illustrating operations performed by a mobile wireless system emergency alert message handling arrangement in accordance with the present disclosure;

DETAILED DESCRIPTION OF THE INVENTION

Exemplary embodiments of the invention described herein address a need to ensure, through reporting successful presentation on mobile devices, that emergency alert messages are effectively disseminated to mobile wireless devices. Such effectiveness includes: coverage in targeted geographic regions, transmission with minimal delay, and presentation on a large percentage of mobile wireless devices within the targeted geographic region. By way of example, effectiveness comprises three aspects: reliability, speed, and accuracy. Reliability pertains to the percentage of received alert messages that are successfully processed by a mobile wireless network entity. Speed relates to the elapsed time between when an emergency alert is introduced into a distribution infrastructure for mobile wireless network services providers and the presentation of the emergency alert message on mobile wireless devices in a target geographic area. Accuracy pertains to the degree of precision in distributing the emergency alert messages to user devices currently located in a geographic area subject to the emergency event.

The networked system and method disclosed herein describes an enhanced emergency alert message distribution arrangement including enhanced functionality incorporated into mobile wireless devices for generating/transmitting an alert response message in association with receiving/processing/presenting emergency alert messages. The alert response messages include a data payload including information facilitating generating measures pertaining to effectiveness (e.g., reliability, speed, and accuracy) of emergency alert message distribution networks. Moreover, a networked server incorporates enhanced functionality for receiving/accumulating/processing alert response message from mobile wireless devices and rendering a variety of reports therefrom, in near-real time.

Figure 1:
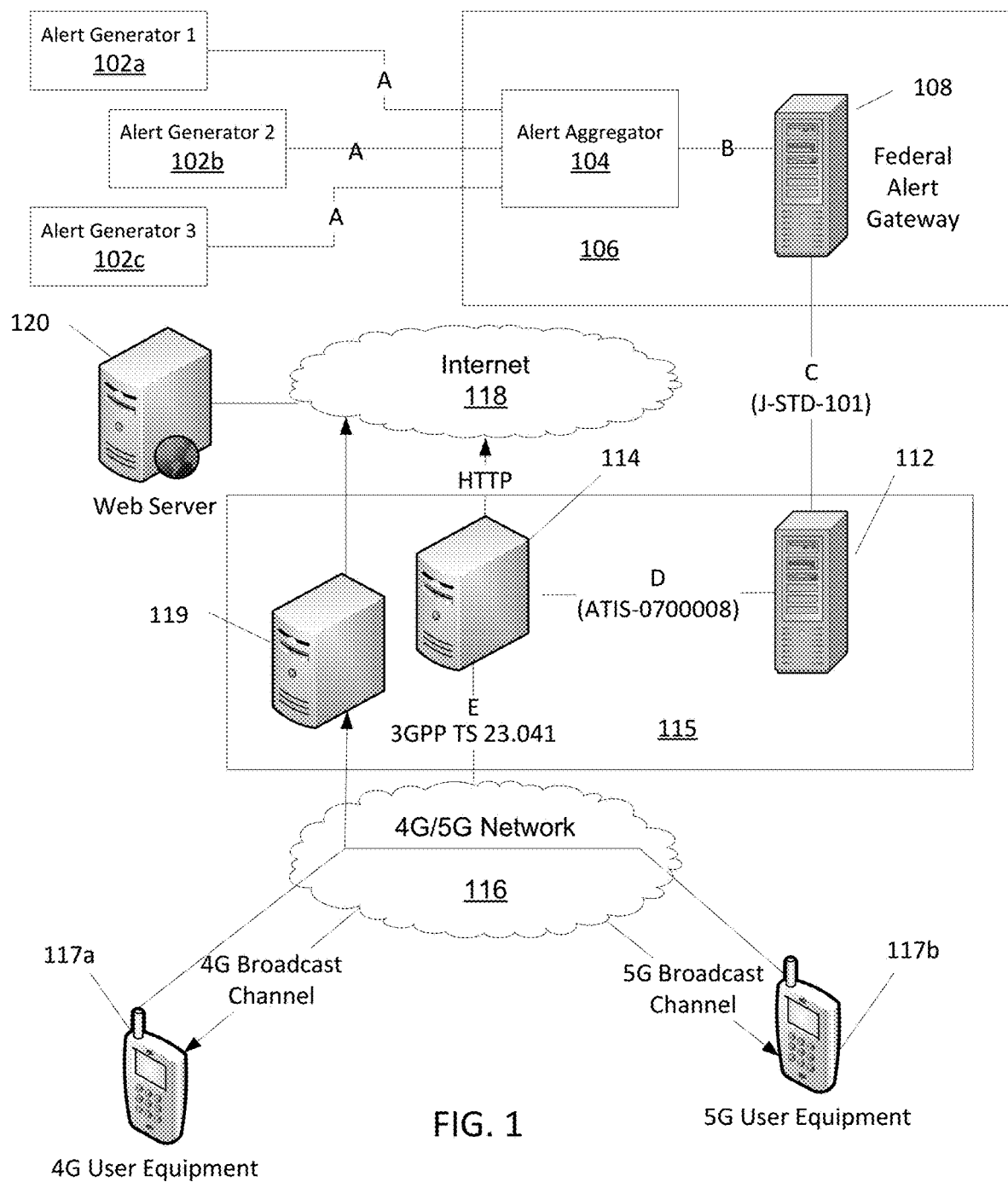
FIG. 1 is an exemplary schematic block diagram depicting an emergency broadcast message distribution infrastructure in accordance with the present disclosure.

Turning to FIG. 1, an exemplary network architecture is schematically depicted that includes an illustrative example of a broadcast message center (BMC) 114 of a mobile wireless core network 115. In accordance with the illustrative examples the BMC 114, in response to initially receiving an emergency alert message, issues (via broadcast) an emergency alert message to mobile wireless carriers for broadcast to mobile wireless devices within an affected geographic area to which the emergency alert pertains. As a consequence, potentially millions of mobile wireless devices may receive an emergency alert message. Additionally, the BMC 114 sends to a web server 120, for each issued/identified emergency alert message, a corresponding emergency alert notification. The emergency alert message is processed by the web server 120 to configure an emergency alert message service for handling the set of alert response messages issued by user devices corresponding to the emergency alert message instance.

Thereafter, the Web Server 120 is configured to handle the set of alert response messages provided by user devices corresponding to the emergency alert message instance in accordance with the disclosure herein. Such dynamic configuration of the web server 120 to handle a high volume of responsive alert response messages for a particular issued emergency alert message, addresses the aforementioned technological problem of determining effectiveness of issued emergency alert messages, by processing corresponding/responsive alert response messages transmitted/provided by individual receiving mobile wireless devices in an affected geographical area. Details of configuring and operating the Web Server 120 to carry out the above-summarized emergency message processing arrangement are described herein below with reference to illustrative examples.

With specific reference to the illustrative emergency alert message distribution infrastructure depicted in FIG. 1, the exemplary emergency alert network infrastructure includes alert generators 102a, 102b, and 102c. The alert generators 102a, 102b, and 102c represent, by way of example, Federal, state, local and tribal agencies that originate emergency broadcast messages distributed via the BMC 114 to mobile wireless devices 117a and 117b. An alert aggregator 104 of a FEMA Domain or alerting framework 106 receives the messages originating from the alert generators 102a, 102b and 102c via Interface A. Interface A incorporates an XML-based Common Alerting Protocol as specified in ITU-T Recommendation X.1303 (an existing protocol used for submitting emergency alerts). The alerting framework 106 is operated, for example, by an authorized government entity (e.g., FEMA). The alerting framework 106 is, in general, a server (or cluster of servers) that aggregate incoming alert messages from the alert generators 102a. 102b and 102c, and deliver the received alert messages to a Federal Alert Gateway 108 via Interface B. Interface B also incorporates the XML-based Common Alerting Protocol as specified in ITU-T Recommendation X.1303.

The Federal Alert Gateway 108 is a server system that is typically administered by a government entity such as FEMA. The alert gateway 108 packages raw alert messages provided by the alert aggregator 104 and transmits the packaged alert messages to commercial mobile wireless service providers including commercial mobile wireless service provider network or domain. In the illustrative example, the alert gateway 108 transmits the packaged alert messages via Interface C to a commercial mobile wireless service provider gateway—e.g., a cell broadcast entity (CBE) 112. Interface C is, for example, a point-to-point communication interface that incorporates an XML based protocol developed for handling interactions between the Federal Alert Gateway 108 and the CBE 112. Interface C is standardized under a joint CMAS specification document (J-STD-101) by members of the TIA and the ATIS standards organizations.

In an illustrative embodiment, the CBE 112 is a specialized application server. The CBE 112 is administered by a commercial mobile wireless service provider. The CBE 112 carries out a store and forward functionality between multiple federal alert message sources, e.g., the Federal Alert Gateway 108, and the BMC 114 via an interface D (e.g., ATIS-0700008). As illustrated in FIG. 1, The CBE 112 communicates with the BMC 114 over an interface D. Interface D is provided, for example, according to the ATIS-0700008 standard, which is a Cell Broadcast Entity to Cell Broadcast Center Interface specification. The ATIS-0700008 standard defines a message transfer protocol on the interface between the CBE 112 and the BMC 114 independent of mobile wireless carrier technology. In particular, ATIS-0700008 provides a common interface that is independent of the mobile wireless carrier technologies that subsequently receive emergency alert messages received by the BMC 114 from the CBE 112. The emergency alert messages transmitted via the interface D, in accordance with illustrative examples, may contain one or more hyperlinks to web content and/or multi-media.

The BMC 114 includes various wireless cellular network support/interface elements for communicating with carrier networks 116 corresponding to each one of multiple types of mobile wireless network carrier technologies. The BMC 114, in an illustrative example, issues emergency alert messages to the various technology-specific ones of the carrier networks 116 via an interface E (e.g., 3GPP TS 23.041). Thereafter, the carrier networks 116 (e.g., 4G/5G wireless networks) forward the emergency alert message to (mobile wireless) user equipment 117a and 117b over their respective mobile wireless technology (e.g., 4G, 5G, etc.) air interface broadcast channels. The wireless technology interfaces may include any of the various mobile wireless communication standards associated with wireless network technologies including: LTE, WCDMA, UMTS, GSM, GPRS, EDGE, or similar telecommunication standards configured to deliver voice and data services to mobile wireless end user devices such as the user equipment 117a and 117b depicted in FIG. 1.

With continued reference to FIG. 1, in accordance with an illustrative example, the BMC 114, upon receiving an emergency alert message from the CBE 112, issues the emergency alert message to the carrier networks 116 for broadcast to the user equipment 117. In particular, the BMC 114 identifies a set of cell sites of the carrier networks 116 that fall within a geographic area designated in the emergency alert message. By way of example, the emergency alert message is a geographically targeted alert that includes a description of a target area. By way of example the BMC 114 identifies cell sites having coverage within the target geographic area. Alternatively, the emergency alert message is a general broadcast message intended for presentation by all receiving user equipment 117 instances within broadcast range of the cell site at the time the emergency alert message is sent.

Continuing with the illustrative example, the user equipment 117 devices are configured with emergency alert message modules for processing received emergency alert messages. The emergency alert message modules are, by way of example, selectively activated by external messaging (e.g., radio resource control (RRC)) to generate measurements/parameters corresponding to various identified events. In accordance with an illustrative example, such capability is adapted to process received instances of emergency alert messages in the manner described herein and issue an alert response message including a data payload including relevant measurements and parameters described, by way of example, herein below. Such enhanced capability (for generating the alert response message) is built into the operating system of the user equipment 117 or provided as an augmented service module installed in a carrier-specific service configuration software package-which is preferred given the potential differences between alert response message handling by various carriers. If the user equipment 117 is to be configured via an update downloaded from a carrier, software updates are issued via a networked node (e.g., from cell site or an application server) to the user equipment 117 to install/enable the alert response message generation/transmission functionality described herein. One possible embodiment is to use existing 3GPP procedures that use RRC reconfiguration messages to setup the user equipment 117 to generating the alert response messages including measurement reporting in accordance with the current disclosure. By way of a particular example, the user equipment 117 is configured with new features relating to generating/transmitting alert response messages through modification/augmentation of known RRConnectionReconfiguration messages. Once configured, the user equipment 117 includes measurements and parameters of interest, responsive to a received/processed emergency alert message, in an alert response message. One possible embodiment of this implementation would be to provide the CMAS measurements in an information element included in an RRC MeasurementReport message. Sec FIG. 2, described below. With this embodiment, the RRC MeasurementReport message is directed to a cell site in the 4G/5G Network 116. The cell site in turn transmits the CMAS measurements to the Web Server 120 via an Internet Gateway 119.

In order to accurately gauge effectiveness of emergency alert message dissemination, it is important to be able to identify devices that can/cannot generate an alert response message. In that regard, all reporting capable instances of the user equipment are configured with the ability to indicate an ability/inability to generate the alert response message. By way of example, the indication is in the form of a flag that, when set, indicates the user equipment 117 instance is capable of issuing an alert response message. Such capability messaging is carried out, by way of example, using modified/augmented versions of a known 3GPP user equipment capability information RRC message. Additionally, device capability, by way of example, is maintained in an offline repository of registered/configured devices, e.g., the Web Server 120.

Additionally, in accordance with illustrative examples of the present disclosure, the web server 120 is further configured to execute emergency alert message support services that carry out aggregation/processing/reporting of alert responses received from user equipment in response to identified emergency alert messages forwarded by the Internet Gateway 119 for broadcast to user equipment. By way of example, the Internet Gateway 119 sends to the web server 120, for each issued/identified emergency alert message, a corresponding emergency alert configuration message via the Internet 118 to the web server 120. The web server 120, in accordance with the emergency alert instance defined in a received emergency alert notification from the BMC 114, sets up a corresponding instance of an emergency alert message handler for receiving/managing/reporting corresponding received alert response messages from a receiving/reporting population of user equipment, in accordance with alert response message aggregation/processing disclosed herein.

In the case of the user equipment 117 that is capable of rendering/issuing an alert response message, the configured emergency alert message module processes the received emergency alert message and generates/issues an appropriate acknowledgement (referred to herein as an alert response message) via an Internet gateway server 119 of the mobile wireless core network 115, to the web server 120 (in accordance with the illustrative example provided herein).

Turning briefly to FIG. 2, an exemplary alert response message data payload. Since it is possible for multiple alerts to be generated within a same window, the exemplary message payload may be repeated for multiple received alert messages. The exemplary payload (corresponding to an alert response for a particular broadcast emergency alert message instance) includes: a message type 210 of the received emergency alert message, a message identifier 220 of the received emergency alert message, a serial number 230 of the received emergency alert message, a message accepted flag 240, a location 250, and a message received timestamp 260. The message type 210 indicates one of a set of supported emergency alert message types (e.g., National, Imminent Threat, AMBER, State/Local Test, etc.). The message identifier 220 identifies a source and type of an emergency notification message that resulted in the emergency alert message dissemination. A serial number 230 identifies a particular emergency alert instance that resulted in dissemination of the emergency alert message. The serial number 230 identifies a particular emergency alert event. The serial number 230 value remains unchanged for multiple re-broadcasts of emergency alert message corresponding to a same emergency alert. The message accepted flag 240 indicates an alert message handling result. By way of example, when "set" the message accepted flag 240 indicates that the user equipment 117 instance received and processed the identified alert message and presented the alert in accordance with a determination that the user equipment 117 was located, at the time of receiving the emergency alert message, within a target geographic area with which the emergency alert message is associated with geotargeted messages or that it simply received a non-geotargeted alert message. The message accepted flag 240, when "not set", indicates that the user equipment 117 instance received and processed the identified alert message, but did not present the message in accordance with a determination that the user equipment 117 instance was not within the target geographic area.

With continued reference to FIG. 2, the location 250 indicates a geographic location of the user equipment 117 at the time of receiving the emergency alert message. A message received timestamp 260 contains a value indicating a time at which the emergency alert message was received by the user equipment 117. The above-described fields of the data payload in an alert response message issued by the user equipment 117 is exemplary as other combinations of reported data may be provided in accordance with alternative illustrative examples.

The responsive operation of the user equipment 117 is based upon a location of the user equipment 117 at the time of receiving the emergency alert message. In that regard, in accordance with the processing/presenting of the received emergency alert message, the user equipment 117 initially determines whether the emergency alert message identifies a geographic region corresponding to the current location of the user equipment 117. In a case where the user equipment 117 determines that a current location of the user equipment 117 falls outside a geographic area subject to the emergency alert, the user equipment 117 generates a "received-not in area" alert response message including appropriate data in the fields of the data payload illustratively depicted in FIG. 2—including not setting the message accepted flag 240.

Additionally, the emergency alert module incorporated into the user equipment 117 is further adapted, in cases where the user equipment falls within the geographic area subject to the emergency alert or non-geographic area was specified by the emergency alert, to present the emergency alert on one or more audio/visual interfaces of the user equipment. In such case, the user equipment 117 generates a "received-in area" alert response message including appropriate data in the fields of the data payload illustratively depicted in FIG. 2—including setting the message accepted flag 240.

It is noted that, given the mobile nature of mobile wireless devices, the user equipment 117 instances may move from outside the geographic area subject to the emergency alert message to inside such geographic area. Thus, a same emergency alert message is periodically sent for the duration of the emergency, and in such case each instance of the same message is given a distinct (sequential) iteration/sequence value/number. Thus, if the user equipment 117 has already presented an identified emergency alert message, the user equipment 117 may disregard the message and therefore not generate an emergency alert response message.

In an illustrative example, the user equipment 117 is configured to generate a random wait period for actual transmission of the alert response message to avoid overloading the response channels of radio access networks with a flood of responses from all devices (both active and idle) currently within the geographic area of interest.

In accordance with the present disclosure, an alert response repository (e.g., web server 120 via the Internet 118) is configured to receive all alert response messages from instances of the user equipment 117, and to store the accumulated alert response messages responsive to the emergency alert message for further analysis and processing to establish effectiveness of the BMC 114's dissemination of the emergency alert message to the user equipment instances. In addition, as noted previously herein above, the web server 120 receives corresponding emergency alert message notifications from the BCM 114, regarding each of the emergency alert messages and applicable geographic areas, to facilitate configuration of the web server 120 services to aggregate/process/report the responsive alert response messages issued by receiving/responding devices in accordance with an overall function/goal of assessing effectiveness/accuracy of emergency alert message instance broadcasts to user devices in mobile wireless networks. In addition, RRC MeasurementReport messages from devices can be used to identify devices within the affected area. In the illustrative example, the Internet gateway server 119 is configured to receive and forward the alert response messages from instances of the user equipment 117 via, for example, the 4G/5G Network 116 to the web server 120. However, such response messaging may be carried out via indirect messaging, via the BMC 114, between the web server 120 and user equipment 117 instances. The contents of an alert response message repository/database, accessed/implemented by the web server 120, are thereafter accessed by any one or more emergency alert message handling instances configured to perform analytical processing and display applications/services described further herein. Importantly, the accumulated alert response messages in the repository/database and other device information based on received RRC MeasurementReport messages associated with devices not generating alert response messages facilitates determining an effectiveness (e.g., reliability, speed, and accuracy) of disseminated emergency alert message instances.

Turning to FIG. 3, a flowchart summarizes steps/stages of the operation of the illustrative system depicted in FIG. 1 to disseminate a received emergency alert via mobile wireless networks, receive and accumulate a set of alert response messages from user equipment 117 instances in targeted geographic areas (for further analysis and presentation via user interfaces depicting the results based on the accumulated set of alert response messages). During 300 the BMC 114 receives an emergency alert issued by a government agency (e.g., the National Weather Service, FEMA, etc.) including information indicating a target geographic area for disseminating an emergency alert message corresponding to the received emergency alert.

During 310, the BMC 114 examines the received emergency alert to determine the target geographic area impacted by the emergency alert.

During 320, the BMC 114 issues, via broadcast channels of a mobile wireless carrier network infrastructure, an emergency alert message. Additionally, a corresponding emergency alert message notification is issued to the web server 120 to initiate configuration of an alert response message handler service instance to handle alert response messages issued by receiving user devices 117 in response to the particular instance of the emergency alert message identified in the emergency alert message. By way of example, the emergency alert message notification is issued by the BMC 114 to the web server 120.

During 330, a set of alert response messages issued by user equipment responding to the emergency alert message are received and stored by an accumulator entity, e.g., web server 120. Instances of the received/stored alert response messages include: an emergency alert identification, a user equipment location, and an alert message handling result. In accordance with an illustrative example, each alert response message includes a data payload including the information fields summarized in FIG. 2 and discussed herein above. Additionally, RRC MeasurementReport data for devices within the affected area are collected.

During 340, the accumulated set of alert response messages and other RCC MeasurementReport data is processed to provide a display indicating user equipment-issued alert response messages. Illustrative examples of such processing are described herein below with reference to FIGS. 4 and 5.

The above-described alert response message generation/accumulation capabilities of a system described herein above, facilitate a substantially real time analysis of the accumulated alert response messages issued by instances of the user equipment 117 in accordance with various conditions under which the instances of the user equipment 117 received the emergency alert message. For example, for any issued emergency alert message instance, the user equipment 117 instance:

(1) does not see the emergency alert message.
(2) sees the emergency alert message, but the user equipment is outside the target area (and the emergency alert is not presented to a user of the device).
(3) sees the emergency alert message, and user equipment is within target area (and the emergency alert is presented to the user of the device).
(4) has seen the emergency alert when the user equipment was outside the target area and not presented, but later sees a rebroadcast of the emergency alert message (and the emergency alert is presented to the user of the device).

In a particular example of determining accuracy, a processing application examines instances of alert responses where the message accepted 240 flag value is set and confirms that the reporting/responding user equipment 117 instances were indeed within the target geographic area at the time of receiving the emergency alert message.

Such processed compiled information extracted from the accumulated alert response messages for particular identified emergency alerts on a geographical map overlaid with specific response values and corresponding locations that facilitates presentation, in real time, a graphical summary from which effectiveness of particular emergency alert message dissemination can be determined, and remedial follow-up actions (i.e., reconfiguring a covered geographic area, re-broadcasting a previously transmitted message, etc.) taken.

Thus, analysis of massive quantities of alert response messages for identified emergency alert message instances (performed substantially in real time) may include, but are not limited to, the following:

A map depicting a broadcast target area for disseminating an emergency alert message instance.

A map indicating a population of user equipment device instances with an indication for each of whether the device instance received the emergency alert message.

Responses received as a function of a time in which the emergency alert message was broadcast and when the emergency alert expired.

Figure 4:
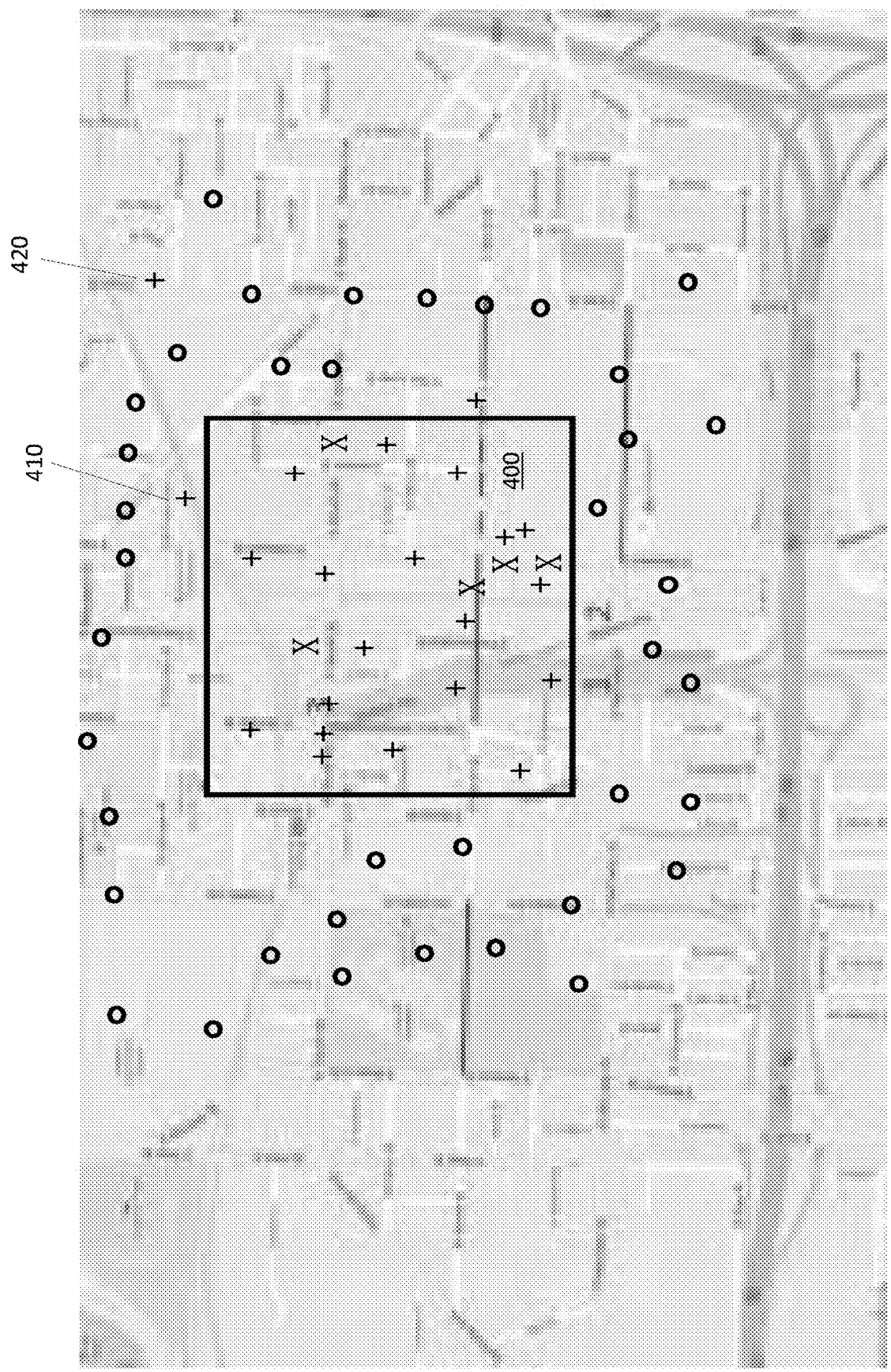
FIG. 4 is an exemplary graphical display rendered from information of data payload of accumulated alert response messages in accordance with the present disclosure.

Turning briefly to FIG. 4 an exemplary visual display, provided in substantially real time, that graphically presents geographic map image including graphical indicators generated in accordance with processing a set of alert response messages from user equipment instances (located both inside and outside a target geographic area) to an emergency alert message. Instances of the graphical indicators are positioned on the geographic map in accordance with a user equipment location provided by an alert response message instance of the set of alert response messages. Moreover, instances of the graphical indicators are presented in a distinct image form in accordance with an alert message handling result in an alert response message instance of the alert response messages corresponding to the emergency alert message.

With continued reference to the illustrative example provided in FIG. 4, a box 400 delimits a target geographic area for an issued emergency alert message. An "alert presented" graphical indicator is provided as a "+" mark that represents devices receiving the emergency alert message and presenting an alert to the user. An extended region that includes and extends outside the box 400 provides an allowed tolerance for devices (e.g., presented indicator 410) that issue alert response messages that indicate an alert message was presented in response to receiving the emergency alert message. Additionally, a presented indicator 420 corresponds to an alert response message instance, of the set of alert response messages, that erroneously presented an alert message even though the responding user device was located outside the extended region (of allowed tolerance) for the intended region of coverage (box 400).

An "alert not presented" graphical indicator is provided as an "O" (open circle) mark that represents devices receiving the emergency alert message and not displaying the message (i.e., presentation suppression was reported because the device determined that a current location of the device did not fall within a geographic target area for presenting an alert corresponding to the received emergency alert message.

A "response not received" graphical indicator is provided as an "X" mark that represents devices determined to be within the target geographic area corresponding to the box 400, for which an alert response message was not received during the accumulating the set of alert response messages, in accordance with the emergency alert message.

As such, the illustrative displayed response graph of FIG. 4 is an example display that is generated in near-real time based upon a plurality of analyzed alert response message instances for a particular emergency alert message broadcast to an indicated geographic area. A further enhancement of the illustrative display of FIG. 4, provides a further overlay depicting cell sites and associated coverage areas.

Figure 5:
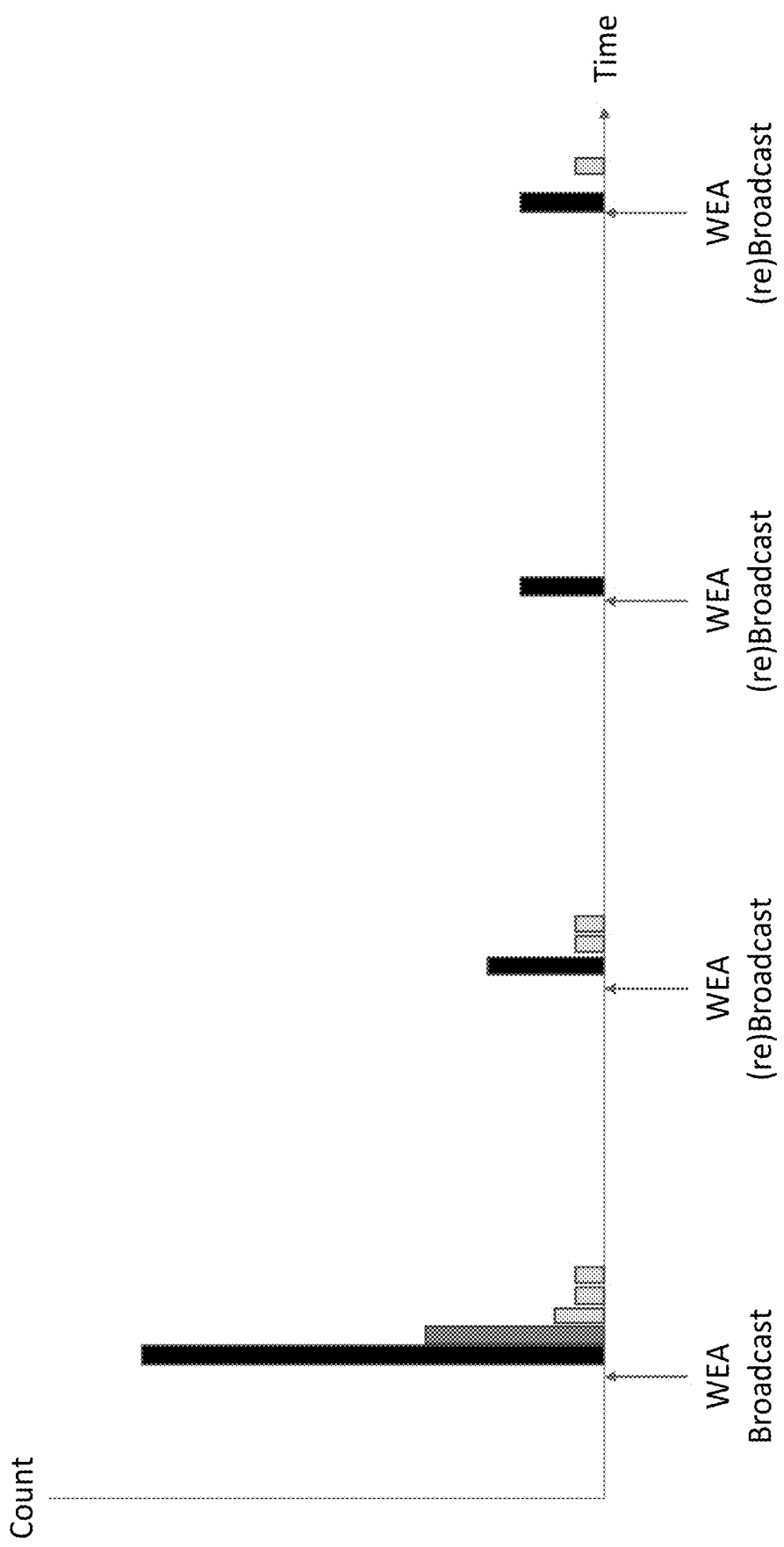
FIG. 5 is a further exemplary graphical display rendered from information of data payload of accumulated alert response messages in accordance with the present disclosure.

Turning briefly to FIG. 5, in yet another example of displaying accumulated alert response messages, a timeline is generated that shows the duration of the message alert (start and stop) with an indication when each device responded-using a different color/shade/pattern on each bar to represent each distinct reported device condition/handling of an emergency alert message. Devices receiving the warning message report shortly after receiving and will include the timestamp when received. The configured handler process on the web server 120 analyzes the timestamps of alert response messages of devices that issued a response message to the web server 120. In the illustrative example, for each (re)broadcast of the emergency alert message, a bar represents quantity of a particular type of response. By way of example, a solid black bar represents devices (within the geographic area indicated by the box 400) that received and presented the emergency alert message on a user device. A dark grey bar represents devices that received the message and did not present the alert message because the device was outside the reporting area. Light grey bars represent/identify devices determined to be within the geographic area indicated by the box 400 that are known to be capable of presenting emergency alerts, but did not present the message. Since all devices generate the "alert capable" message periodically, the web server 120 must compare such received response to the listing of devices that have presented the emergency alert and reported such presentation previously (i.e., the solid black bar). It may also be desired to only report this category once per device per plotting interval.

In yet other illustrative reporting arrangements, detailed statistics are provided, e.g., percent of devices within broadcast area receiving the message, percent of devices not receiving the message, percent of devices outside the broadcast area reporting reception, etc.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Illustrative embodiments of this invention are described herein. Variations of the illustrative embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for providing an accumulated set of alert response message content arising from disseminating an emergency alert message to user equipment via mobile wireless network infrastructure, the method comprising:
   receiving an emergency alert issued by an emergency alert system, the emergency alert including: an emergency description, and a target geographic area;
   disseminating an emergency alert message, corresponding to the emergency alert, to user equipment via mobile wireless infrastructure;
   accumulating a set of alert response messages issued by user equipment responding to the emergency alert message, wherein instances of the alert response messages provide: an emergency alert identification, a user equipment location, and an alert message handling result; and
   presenting, in accordance with processing the set of alert response messages, an aggregated result indicating user equipment-issued alert response messages.

2. The method of claim 1, wherein processing the set of alert response messages is carried out by a server, and
   wherein the method further comprises issuing an emergency alert notification to the server for configuring an emergency alert message service for handling the set of alert response messages during the processing.

3. The method of claim 1, wherein the instances of the alert response messages further provide a timestamp.

4. The method of claim 1, wherein, during the presenting, the aggregated result is presented as a graphical display image.

5. The method of claim 4, wherein the graphical display image comprises a geographical map depicting locations of responding user equipment corresponding to the set of alert response messages.

6. The method of claim 5, wherein visual depictions of individual ones of the set of alert response messages are displayed using a set of graphical indicator types corresponding to a status of the alert message handling result.

7. The method of claim 6, wherein the set of graphical indicator types includes an alert presented graphical indicator type that corresponds to an alert response message from a user device that presented an alert on the user device in accordance with the emergency alert message.

8. The method of claim 7, wherein the alert presented graphical indicator type is assigned without regard to geographic location of the user device that presented the alert on the user device.

9. The method of claim 7, wherein the set of graphical indicator types include an alert not presented graphical indicator type that corresponds to an alert response message from a further user device, that did not present an alert on the further user device in accordance with the emergency alert message.

10. The method of claim 7, wherein the geographic map further depicts a further graphical indicator type corresponding to a further user device, located within a geographic area associated with the emergency alert message, for which an alert response message was not received during the accumulating the set of alert response messages, in accordance with the emergency alert message.

11. A system configured to carry out a method for providing an accumulated set of alert response message content arising from disseminating an emergency alert message to user equipment via mobile wireless network infrastructure, wherein the system comprises at least an emergency alert broadcasting node and an alert response message handler node, wherein the emergency alert broadcasting node and the alert response message handler node comprise at least one processor and a non-transitory computer-readable medium including computer-executable instructions that, when executed by the at least one processor, facilitate carrying out the method comprising:
   receiving an emergency alert issued by an emergency alert system, the emergency alert including: an emergency description, and a target geographic area;
   disseminating an emergency alert message, corresponding to the emergency alert, to user equipment via mobile wireless infrastructure;
   accumulating a set of alert response messages issued by user equipment responding to the emergency alert message, wherein instances of the alert response messages provide:
      an emergency alert identification,
      a user equipment location, and
      an alert message handling result; and presenting, in accordance with processing the set of alert response messages, an aggregated result indicating user equipment-issued alert response messages.

12. The system of claim 11, wherein processing the set of alert response messages is carried out by a server, and wherein the method further comprises issuing an emergency alert notification to the server for configuring an emergency alert message service for handling the set of alert response messages during the processing.

13. The system of claim 11, wherein the instances of the alert response messages further provide a timestamp.

14. The system of claim 11, wherein, during the presenting, the aggregated result is presented as a graphical display image.

15. The system of claim 14, wherein the graphical display image comprises a geographical map depicting locations of responding user equipment corresponding to the set of alert response messages.

16. The system of claim 15, wherein visual depictions of individual ones of the set of alert response messages are displayed using a set of graphical indicator types corresponding to a status of the alert message handling result.

17. The system of claim 16, wherein the set of graphical indicator types includes an alert presented graphical indicator type that corresponds to an alert response message from a user device that presented an alert on the user device in accordance with the emergency alert message.

18. The system of claim 17, wherein the alert presented graphical indicator type is assigned without regard to geographic location of the user device that presented the alert on the user device.

19. The system of claim 17, wherein the set of graphical indicator types include an alert not presented graphical indicator type that corresponds to an alert response message from a further user device that did not present an alert on the further user device in accordance with the emergency alert message.

20. The system of claim 17, wherein the geographic map further depicts a further graphical indicator type corresponding to a further user device, located within a geographic area associated with the emergency alert message, for which an alert response message was not received during the accumulating the set of alert response messages, in accordance with the emergency alert message.

\* \* \* \* \*